(12) United States Patent
Miyama et al.

(10) Patent No.: US 11,152,875 B2
(45) Date of Patent: Oct. 19, 2021

(54) MULTIGROUP-MULTIPHASE ROTARY ELECTRICAL MACHINE CONTROL DEVICE AND MULTIGROUP-MULTIPHASE ROTARY ELECTRICAL MACHINE DRIVE DEVICE

(71) Applicant: MITSUBISHI ELECTRIC CORPORATION, Chiyoda-ku (JP)

(72) Inventors: Yoshihiro Miyama, Chiyoda-ku (JP); Moriyuki Hazeyama, Chiyoda-ku (JP); Kodai Okazaki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/963,888

(22) PCT Filed: Dec. 11, 2018

(86) PCT No.: PCT/JP2018/045500
§ 371 (c)(1),
(2) Date: Jul. 22, 2020

(87) PCT Pub. No.: WO2019/155756
PCT Pub. Date: Aug. 15, 2019

(65) Prior Publication Data
US 2020/0395875 A1    Dec. 17, 2020

(30) Foreign Application Priority Data
Feb. 8, 2018    (JP) .............................. JP2018-021163

(51) Int. Cl.
*H02K 29/06* (2006.01)
*H02P 6/10* (2006.01)
(Continued)

(52) U.S. Cl.
CPC ................. *H02P 6/10* (2013.01); *H02K 3/28* (2013.01); *H02P 21/141* (2013.01); *H02P 21/22* (2016.02);
(Continued)

(58) Field of Classification Search
CPC .......... H02P 6/10; H02P 21/22; H02P 21/141; H02P 27/08; H02K 3/28
(Continued)

(56) References Cited

U.S. PATENT DOCUMENTS 6,404,152 B1 *  6/2002  Kobayashi ................ H02P 6/10
                                                     318/400.23
8,749,192 B2    6/2014  Li et al.
(Continued)

FOREIGN PATENT DOCUMENTS

JP    2009-296706 A    12/2009
JP    2013-504293 A    2/2013
(Continued)

OTHER PUBLICATIONS

International Search Report dated Mar. 12, 2019 in PCT/JP2018/045500 filed Dec. 11, 2018, 1 page.
(Continued)

*Primary Examiner* — Erick D Glass
(74) *Attorney, Agent, or Firm* — Xsensus LLP

(57) ABSTRACT

A multigroup, multiphase rotary electric machine control device including: a control target calculator to calculate an initial current command value of each phase based on a torque command value; a correction coefficient calculator to calculate a per-group correction coefficient corresponding to each group from a spatial mode M (M is 0 or a positive integer) of an electromagnetic force caused by magnetic flux density variation with respect to a rotational periodicity at the time of rotation of the multigroup, multiphase rotary (Continued)

electric machine; and a current command value corrector to calculate a current command value of the each phase, which is corrected based on the initial current command value and the per-group correction coefficient.

11 Claims, 9 Drawing Sheets

(51) Int. Cl.
    *H02P 21/22*     (2016.01)
    *H02K 3/28*     (2006.01)
    *H02P 21/14*     (2016.01)
    *H02P 25/22*     (2006.01)
    *H02P 27/08*     (2006.01)

(52) U.S. Cl.
    CPC .............. *H02P 25/22* (2013.01); *H02P 27/08* (2013.01); *H02K 2213/09* (2013.01)

(58) Field of Classification Search
    USPC .................................................... 318/400.23
    See application file for complete search history.

(56) References Cited

U.S. PATENT DOCUMENTS

| | | | | |
|---|---|---|---|---|
| 2004/0155616 A1* | 8/2004 | Iribe | ......................... | H02P 3/22 |
| | | | | 318/432 |
| 2013/0099719 A1* | 4/2013 | Shibata | .................. | G01B 21/04 |
| | | | | 318/619 |
| 2014/0039742 A1* | 2/2014 | Tanaka | ................... | B62M 23/02 |
| | | | | 701/22 |
| 2014/0145660 A1 | 5/2014 | Shimada et al. | | |

FOREIGN PATENT DOCUMENTS

| | | |
|---|---|---|
| JP | 2017-212815 A | 11/2017 |
| WO | WO 2011/027237 A1 | 3/2011 |

OTHER PUBLICATIONS

Office Action dated Apr. 22, 2021, in corresponding Indian patent Application No. 202027031623, 6 pages.

\* cited by examiner

MULTIGROUP-MULTIPHASE ROTARY ELECTRICAL MACHINE CONTROL DEVICE AND MULTIGROUP-MULTIPHASE ROTARY ELECTRICAL MACHINE DRIVE DEVICE

TECHNICAL FIELD

The present invention relates to a multigroup, multiphase rotary electric machine control device and a multigroup, multiphase rotary electric machine drive device, which are to be used in, for example, an electric power steering apparatus or an elevator hoisting machine.

BACKGROUND ART

There has been disclosed a control device configured to control a multigroup, multiphase rotary electric machine through use of a plurality of three-phase inverters (see, for example, Patent Literature 1). Further, there has been disclosed a control device configured to correct a current value of each phase in order to reduce torque ripple that occurs in a rotary electric machine including windings having axial eccentricity (see, for example, Patent Literature 2).

CITATION LIST

Patent Literature

[PTL 1] JP 2013-504293 A (p. 4 and p. 5, FIG. 12)
[PTL 2] JP 2009-296706 A (p. 6 and p. 7, FIG. 1)

SUMMARY OF INVENTION

Technical Problem

In general, along with a manufacturing error of the rotary electric machine, eccentricity or circularity deviation of a stator or a rotor occurs. Because of this eccentricity or circularity deviation, a gap between the stator and the rotor changes during one rotation period. Therefore, there have been problems in that a magnetic flux density varies during the one rotation period, and thus vibration and noise are caused.

In the related-art method of controlling the rotary electric machine, the magnetic flux density variation caused during the one rotation period cannot be corrected, and occurrence of the vibration and the noise cannot be suppressed.

The present invention has been made to solve the above-mentioned problems, and has an object to correct magnetic flux density variation caused during one rotation period even when eccentricity or circularity deviation of a stator or a rotor occurs along with a manufacturing error of a rotary electric machine. As a result, occurrence of vibration and noise of the rotary electric machine can be suppressed.

Solution to Problem

A multigroup, multiphase rotary electric machine control device according to the present invention is a multigroup, multiphase rotary electric machine control device, which is configured to control a multigroup, multiphase rotary electric machine including different groups of windings arranged at positions in mechanical spatial phase differing by 360/(N+1) (N is an integer of 1 or more) degrees, the multigroup, multiphase rotary electric machine control device including: a control target calculation unit configured to calculate an initial current command value of each phase based on a torque command value; a correction coefficient calculation unit configured to calculate a per-group correction coefficient corresponding to each group from a spatial mode M (M is 0 or a positive integer) of an electromagnetic force caused by magnetic flux density variation with respect to a rotational periodicity at the time of rotation of the multigroup, multiphase rotary electric machine; and a current command value correction unit configured to calculate a current command value of the each phase, which is corrected based on the initial current command value and the per-group correction coefficient.

Advantageous Effects of Invention

According to the present invention, the multigroup, multiphase rotary electric machine control device includes:

the correction coefficient calculation unit configured to calculate the per-group correction coefficient corresponding to each group from the spatial mode M (M is 0 or a positive integer) of the electromagnetic force caused by the magnetic flux density variation with respect to the rotational periodicity at the time of rotation of the multigroup, multiphase rotary electric machine; and the current command value correction unit configured to calculate the current command value of the each phase, which is corrected based on the initial current command value and the per-group correction coefficient.

Therefore, even when eccentricity or circularity deviation of the stator or the rotor occurs along with the manufacturing error of the rotary electric machine, the magnetic flux density variation caused during one rotation period can be corrected.

DESCRIPTION OF EMBODIMENTS

First Embodiment

Figure 1:
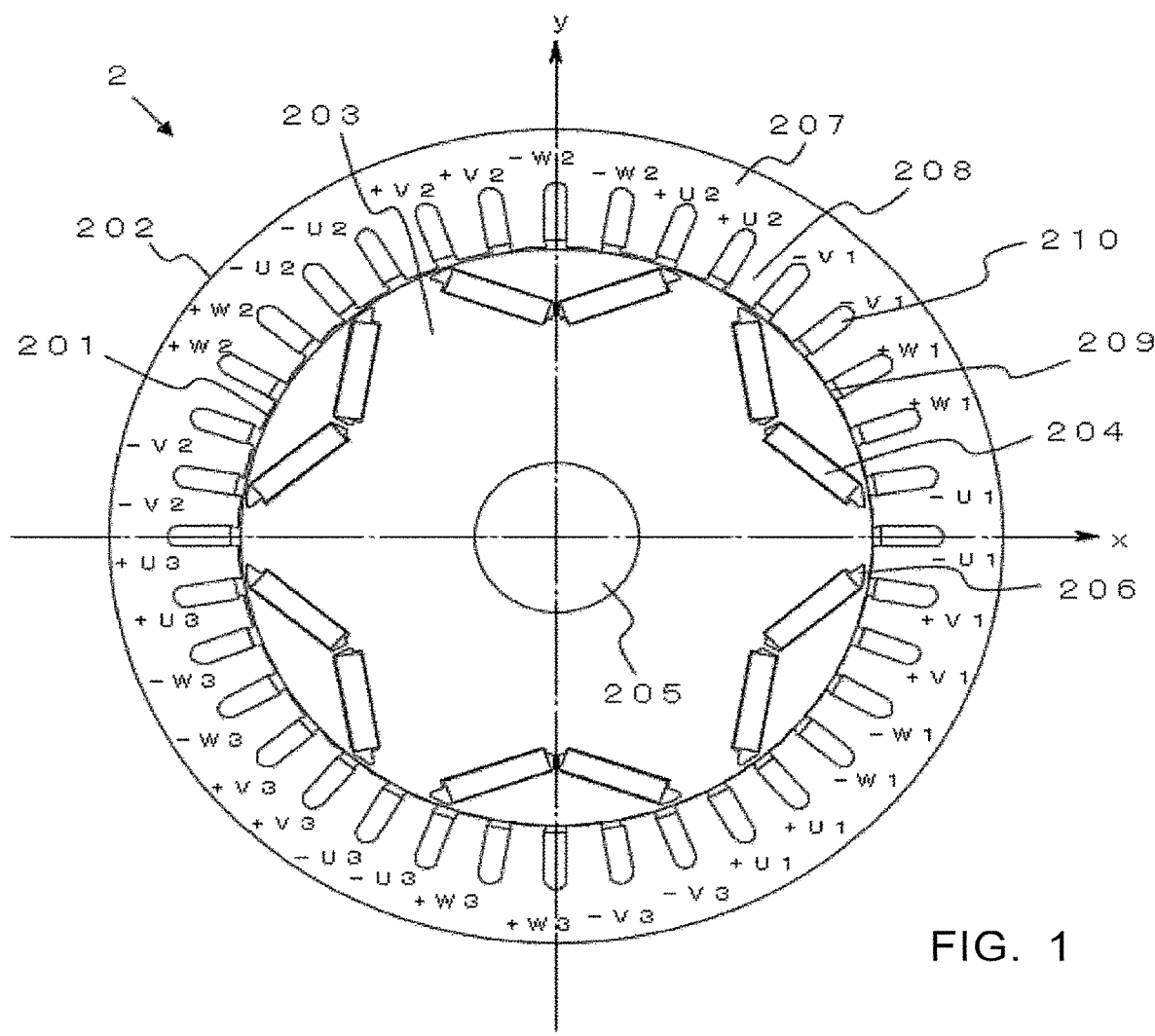
FIG. 1 is a schematic sectional view for illustrating a rotary electric machine in a first embodiment of the present invention.

FIG. 1 is a schematic sectional view for illustrating the structure of a multigroup, multiphase rotary electric machine in a first embodiment for embodying the present invention. In this embodiment, description is given of a three-group three-phase distributed-winding permanent-magnet synchronous rotary electric machine illustrated in FIG. 1 as an example. In FIG. 1, a rotational axis direction of the rotary electric machine is represented by a "z axis", and directions perpendicular to the z axis are represented by an "x axis" and a "y axis".

As illustrated in FIG. 1, a rotary electric machine 2 of this embodiment includes a rotor 201 and a stator 202. The rotor 201 includes a rotor core 203, permanent magnets 204, and a shaft 205. The rotor core 203 is formed by laminating magnetic steel sheets. The rotor core 203 has six V-shaped paired magnet slots 206 arranged at equal intervals in a circumferential direction. The permanent magnets 204 are inserted into the magnet slots 206, and one V shape forms one pole. The permanent magnets 204 are arranged so that N poles and S poles are arranged alternately in the circumferential direction. The shaft 205 is provided on a radially inner side of the rotor core 203, and is press-fitted into the rotor core 203.

The stator 202 includes thirty-six stator teeth 208 protruding in a radially inner direction from an annular stator yoke 207, and a stator coil 210 inserted in stator slots 209 formed between adjacent stator teeth 208 and arranged with a distributed winding in which a coil is arranged for every six slots in the circumferential direction.

The stator coil 210 includes, in association with the three groups and the three phases, a U1 coil, a V1 coil, and a W1 coil, which correspond to the three phases of the first group, a U2 coil, a V2 coil, and a W2 coil, which correspond to the three phases of the second group, and a U3 coil, a V3 coil, and a W3 coil, which correspond to the three phases of the third group.

In FIG. 1, the plus and minus signs of the stator coil represent whether the direction of the current is upward or downward in a direction perpendicular to the drawing sheet. The three-phase coils of the first group are received in twelve stator slots 209 adjacent to each other in the circumferential direction of the thirty-six stator slots 209. Further, the three-phase coils of the second group are received in twelve stator slots 209 adjacent to the twelve stator slots 209 receiving the three-phase coils of the first group, and the three-phase coils of the third group are received in the remaining twelve stator slots 209 adjacent to each other. As described above, the three-layer three-phase coils are arranged so that the three groups are located at positions shifted by 120 degrees with respect to a mechanical angle of 360 degrees corresponding to one mechanical rotation.

Figure 2:
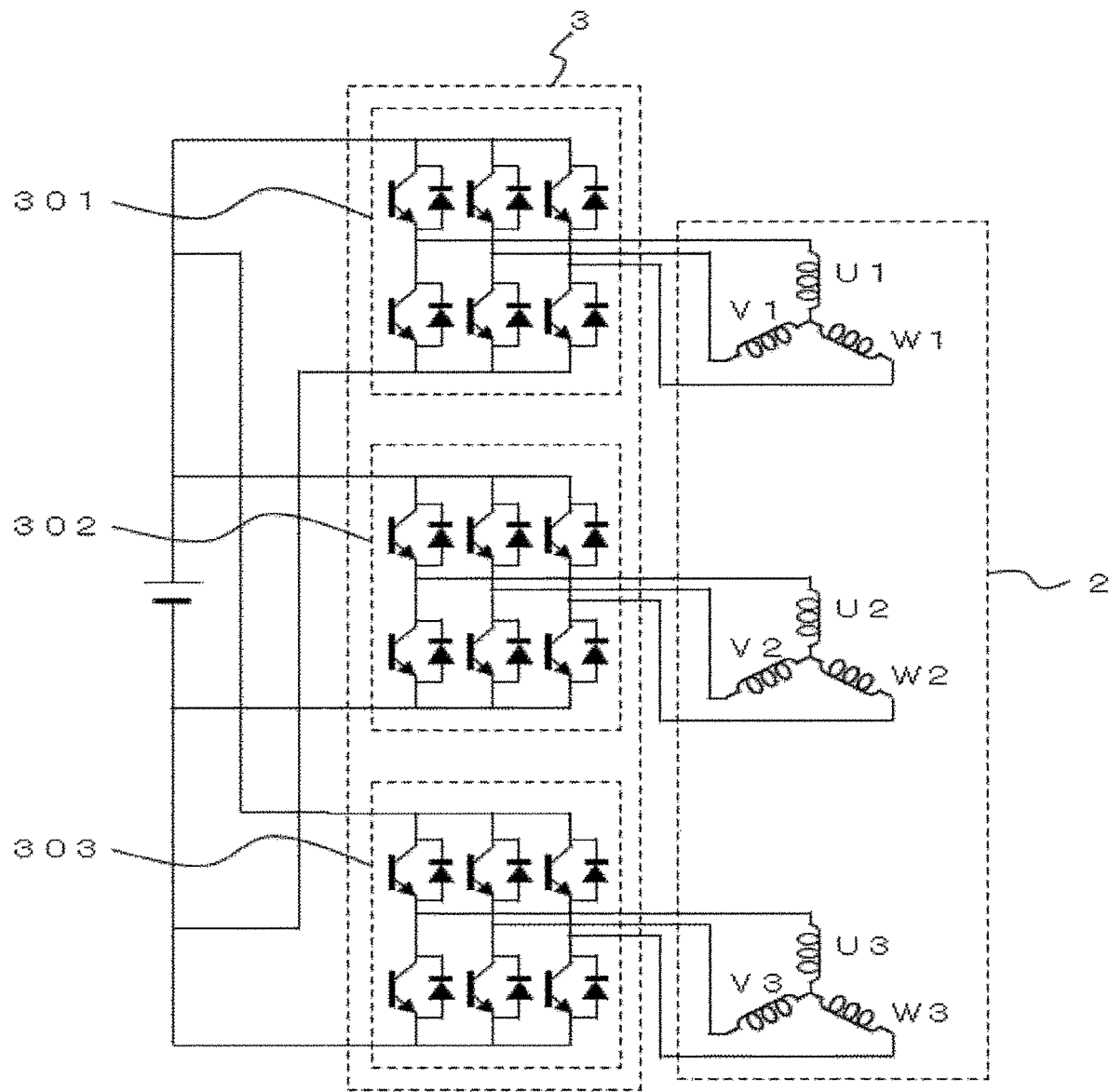
FIG. 2 is a schematic view for illustrating connection between the rotary electric machine and an inverter in the first embodiment of the present invention.

FIG. 2 is a schematic view for illustrating connection between the rotary electric machine 2 and an inverter 3 of this embodiment. As illustrated in FIG. 2, the three-phase coils of the three groups are connected to different three-phase inverters 301, 302, and 303, respectively. The three-phase coils of the three groups are individually controlled by the three-phase inverters 301, 302, and 303, respectively.

Next, description is given of correction for eccentricity or circularity deviation of the stator 202 or the rotor 201.

It is assumed that, as illustrated in FIG. 1, the stator 202 and the rotor 201 of the rotary electric machine 2 are mutually eccentric, specifically, the stator 202 and the rotor 201 are brought close to each other in the +x direction, and the stator 202 and the rotor 201 are separated away from each other in the −x direction.

When current control of the related art is performed under this state, currents are controlled to be equally supplied to the three groups. As a result, in the +x direction, a gap dimension is smaller than a reference value, and hence a gap magnetic flux density is increased. On the other hand, in the −x direction, the gap dimension is larger than the reference value, and hence the gap magnetic flux density is decreased. In such a case, a harmonic wave that increases and decreases once with respect to one period in mechanical angle is superimposed on an electromagnetic force that is proportional to the square of the gap magnetic flux density. In this case, the reference value refers to a gap dimension obtained when it is assumed that neither of eccentricity nor circularity deviation of the stator 202 or the rotor 201 occurs in the rotary electric machine.

In the six-pole thirty-six-slot rotary electric machine illustrated in FIG. 1, one period in mechanical angle corresponds to three periods in electric angle, and therefore deformation of the electromagnetic force having the fundamental wave (electric angle spatial first order) in the electric angle corresponds to the spatial third order in the mechanical angle. Therefore, in the six-pole thirty-six-slot rotary electric machine, a deformation mode corresponding to the spatial third order is generated as the lowest-order electromagnetic force excluding the spatial zero order, and causes resonance at the lowest frequency. Meanwhile, when eccentricity occurs as described above, a harmonic wave of the electromagnetic force that increases and decreases once with respect to one period in mechanical angle is superimposed, and the above-mentioned spatial third-order electromagnetic force is modulated into spatial second order and spatial fourth order to cause resonance. The eigenvalue of the spatial second order (mode 2) is lower in resonant frequency than the eigenvalue of the spatial third order. Further, in general, a resonant frequency having a lower order is larger in transfer function at the time of resonance, and hence problems are liable to occur as vibration and noise.

Figure 3:
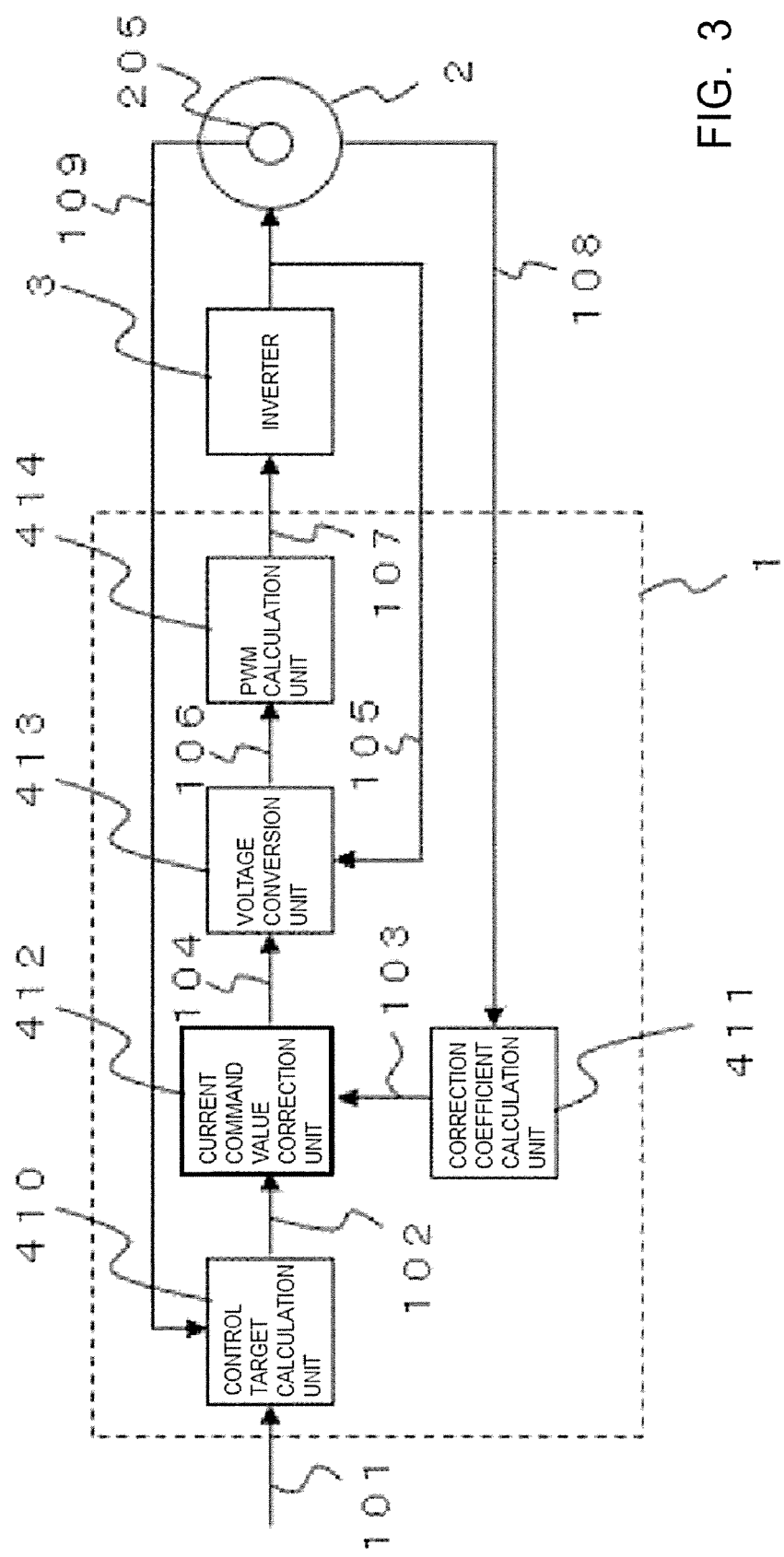
FIG. 3 is a schematic diagram for illustrating a rotary electric machine control device according to the first embodiment of the present invention.

FIG. 3 is a schematic diagram for illustrating a rotary electric machine control device of this embodiment. A control device 1 of this embodiment includes a control target calculation unit 410 (see Step S1 of FIG. 4), a correction coefficient calculation unit 411 to be described later, a current command value correction unit 412 (see Step S3 of FIG. 4), a voltage conversion unit 413 (see Step S4 of FIG. 4), and a PWM calculation unit 414 (see Step S5 of FIG. 4). The control target calculation unit 410 is configured to compute a per-phase current initial value 102 of each group based on a torque command value 101 transmitted from the outside. The current command value correction unit 412 is configured to calculate a per-phase current command value 104 of each group corrected through use of a correction coefficient 103, based on the per-phase current initial value 102 of each group and the correction coefficient 103 calculated by the correction coefficient calculation unit 411. The voltage conversion unit 413 is configured to convert the per-phase current command value 104 into a per-phase voltage command value 106 of each group, based on the per-phase current command value 104 and an actually-supplied current value 105 of each phase of each group. The PWM calculation unit 414 is configured to compute a gate signal 107 to be output to the inverter 3, based on the per-phase voltage command value 106. The per-phase current initial value 102 of each group corresponds to a current command value of each phase of each group in a case in which neither eccentricity nor circularity deviation of the stator 202 or the rotor 201 occurs.

The inverter 3 includes the three-phase inverters 301, 302, and 303 illustrated in FIG. 2. The inverter 3 operates as a power conversion unit. The inverter 3 causes a current to flow through a winding of each phase of each group based on the gate signal 107 output from the PWM calculation unit 414. The shaft 205 of the rotary electric machine 2 has a function of detecting a rotational position thereof to transmit a detection value 109 of the rotational position to the control target calculation unit 410. Further, the rotary electric machine 2 has a function of detecting variation of a magnetic flux density of each group to transmit a detection value 108 of the variation to the correction coefficient calculation unit 411. In this embodiment, the control device 1 and the inverter 3 form a drive device for the rotary electric machine 2.

Figure 4:
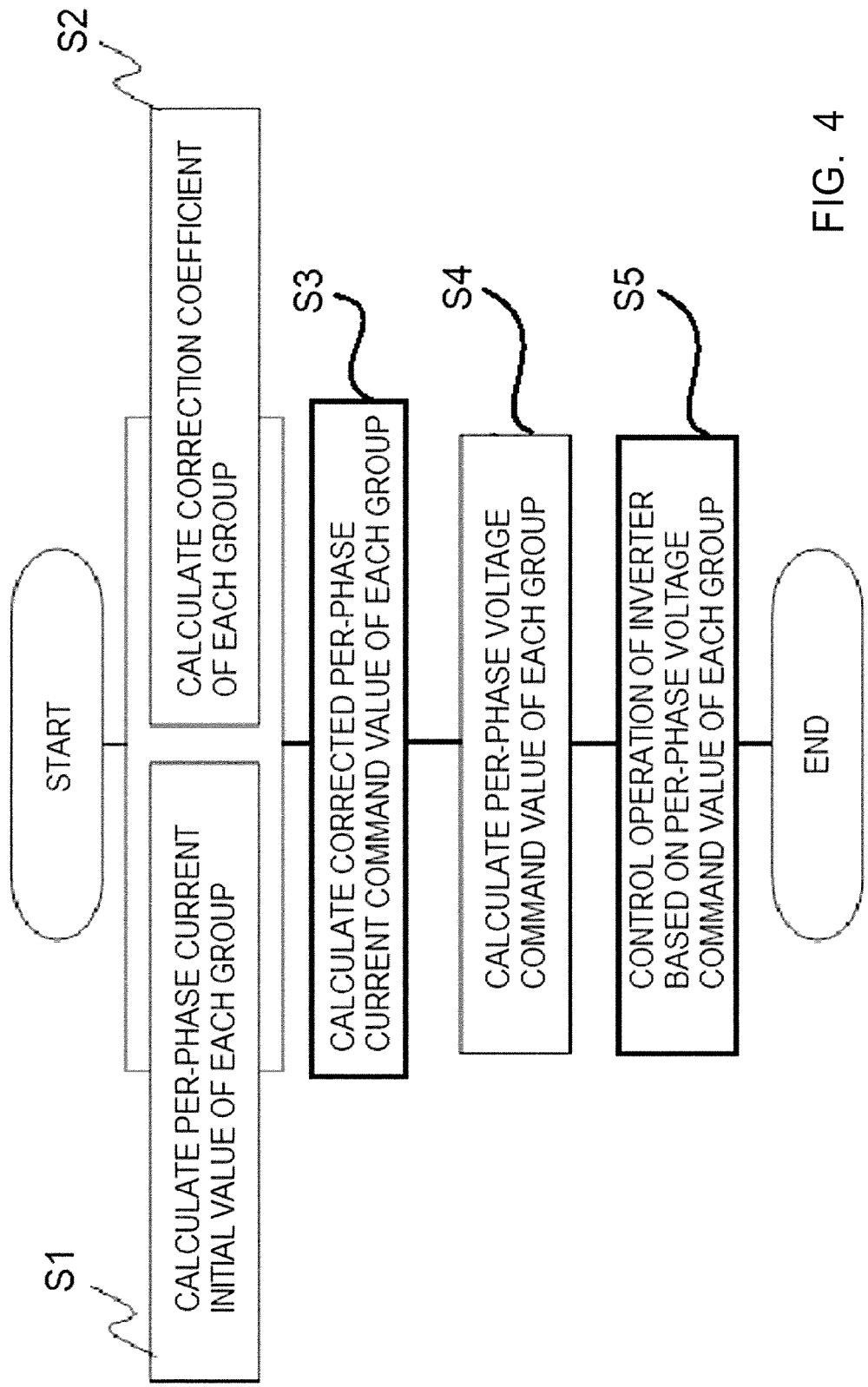
FIG. 4 is a flow chart for illustrating a flow of processing to be performed by the rotary electric machine control device according to the first embodiment of the present invention.

The correction coefficient calculation unit 411 calculates the correction coefficient based on a ratio between an average value and the magnetic flux density of each group so that the magnetic flux densities of the three groups are averaged (see Step S2 of FIG. 4). In other words, the correction coefficient calculation unit 411 calculates a per-group correction coefficient corresponding to each group from a spatial mode M (M is 0 or a positive integer) of an electromagnetic force caused by magnetic flux density variation with respect to a rotational periodicity at the time of rotation of the rotary electric machine. The spatial mode M represents a state in which the magnetic flux density varies M times in a sine-wave shape with respect to one mechanical rotation of the rotary electric machine. Further, the magnetic flux density is detected by, for example, a Hall sensor.

The current command value correction unit 412 multiplies the command value of each group by the correction coefficient 103 to calculate the corrected per-phase current command value of each group (see Step S3 of FIG. 4).

FIG. 4 is a flow chart for illustrating a flow of processing to be performed by the rotary electric machine control device of this embodiment.

As illustrated in FIG. 4, in the control device 1, in Step S1, the control target calculation unit 410 receives the torque command value 101 and the detection value 109 of the rotational position of the rotary electric machine 2 to compute the per-phase current initial value 102 of each group based on the torque command value 101 and the detection value 109 of the rotational position.

In Step S2, in parallel to the processing of Step S1, the correction coefficient calculation unit 411 uses the detection value 108 of the magnetic flux density, which is detected by the Hall sensor, to obtain an average value of the detection values 108 of the magnetic flux densities of the three groups so that the magnetic flux densities of the three groups are averaged, to thereby calculate the correction coefficient 103 from the ratio between the average value and the detection value 108 of the magnetic flux density of each group.

In Step S3, the current command value correction unit 412 receives the per-phase current initial value 102 of each group and the correction coefficient 103 of each group to multiply the per-phase current initial value 102 of each group by the correction coefficient 103 of each group, to thereby calculate the current command value 104 of each group.

In Step S4, the voltage conversion unit 413 receives the current command value 104 of each group and the detected current value 105 of each group to calculate the per-phase voltage command value 106 of each group based on the current command value 104 of each group and the current value 105 of each group. As the calculation method, for example, the voltage conversion unit 413 performs PI control until the difference between the current command value 104 of each group and the current value 105 of each group becomes 0 to calculate the per-phase voltage command value 106 of each group.

In Step S5, the PWM calculation unit 414 computes the gate signal 107 to be output to the inverter 3 based on the per-phase voltage command value 106 of each group to control the operation of the inverter 3.

Figure 5:
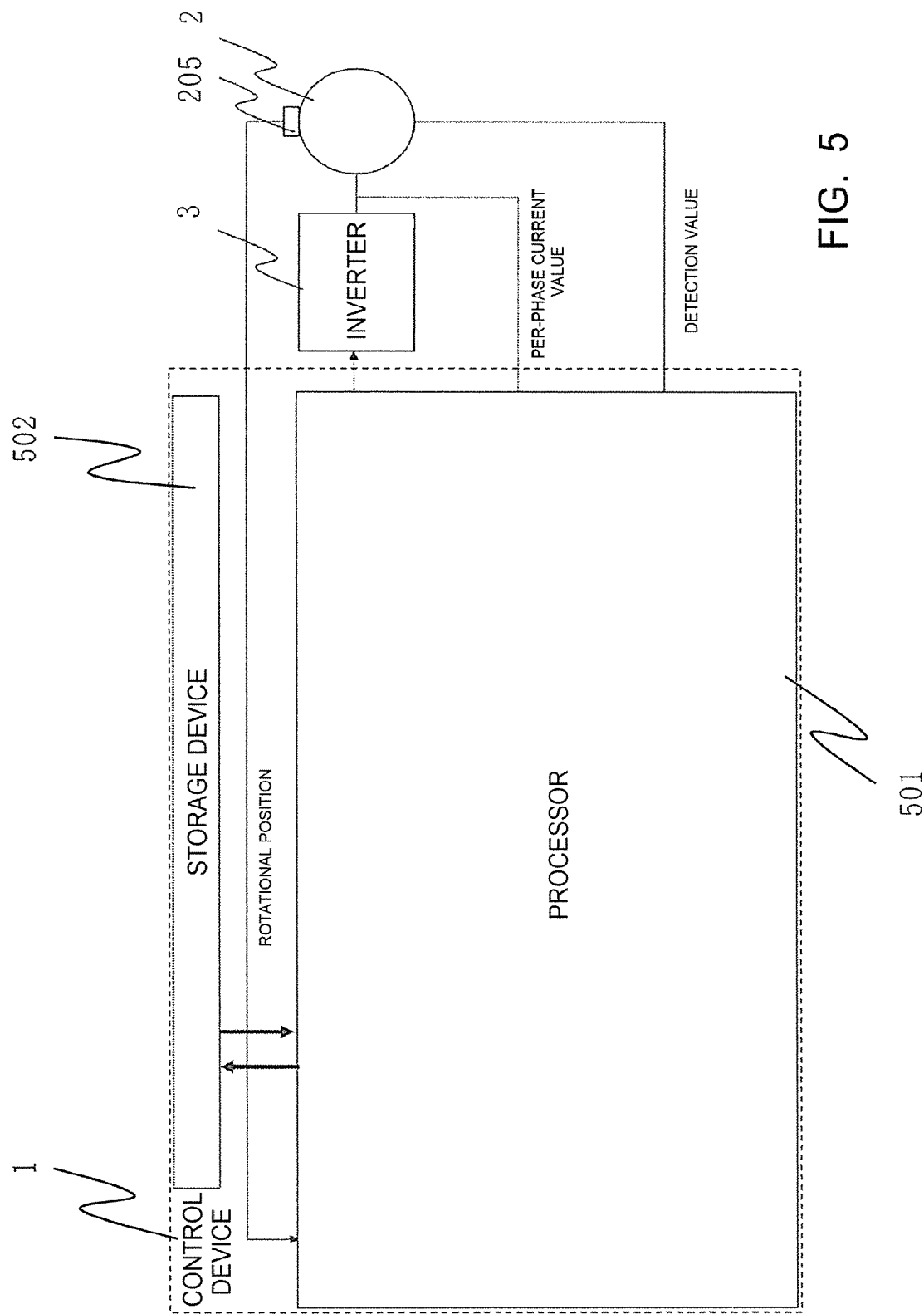
FIG. 5 is a configuration diagram for illustrating a hardware configuration of the rotary electric machine control device according to the first embodiment of the present invention.

FIG. 5 is a configuration diagram for illustrating a hardware configuration of the control device 1. As described above, the control device 1 and the inverter 3 form the drive device. The drive device uses the rotary electric machine 2 to drive a load (not shown) connected to the rotary electric machine 2. As illustrated in FIG. 5, the control device 1 includes, as a hardware configuration, a processor 501 and a storage device 502. Functions of the control target calculation unit 410, the correction coefficient calculation unit 411, the current command value correction unit 412, the voltage conversion unit 413, and the PWM calculation unit 414 illustrated in FIG. 3 are implemented by the processor 501 reading out and executing a program stored in the storage device 502.

The storage device 502 includes, although not shown, a volatile storage device, for example, a random access memory, and a non-volatile auxiliary storage device, for example, a flash memory. In place of the non-volatile auxiliary storage device, a hard disk or other auxiliary storage device may be included.

A program is input to the processor 501 from the auxiliary storage device of the storage device 502 via the volatile storage device. The processor 501 executes the program input from the storage device 502. Further, the processor 501 outputs computed results or other data to the volatile storage device of the storage device 502, or outputs the data to the auxiliary storage device via the volatile storage device to store the data.

The control target calculation unit 410, the correction coefficient calculation unit 411, the current command value correction unit 412, the voltage conversion unit 413, and the PWM calculation unit 414 may be implemented by a system LSI or other processing circuit.

In the control device 1 configured as described above, a state in which a gap dimension has variation due to eccentricity or circularity deviation of the stator 202 or the rotor 201 is detected or estimated so as to suppress generation of a low-order mode in the electromagnetic force along with the variation. In the example illustrated in FIG. 1, correction is performed so that the per-phase current command value of a group present on a side (+x direction) on which the gap dimension is decreased due to eccentricity is decreased, and so that the per-phase current command value of a group present on a side (−x direction) on which the gap dimension is increased is increased.

In the rotary electric machine controlled by the control device 1 configured as described above, a low-order waveform is not generated in the magnetic flux density distribution of the gap. Therefore, an electromagnetic force that causes low-order deformation is not generated, and it is possible to prevent occurrence of resonance at a low frequency or occurrence of resonance having large response.

In this embodiment, the three-phase windings of the three groups are arranged at every 120 degrees in mechanical angle, and hence the variation in gap magnetic flux density can be detected by three (eccentricity) vectors shifted by 120 degrees. Therefore, an exciting force that deforms once with respect to one period in mechanical angle and an exciting force that deforms twice with respect to one period in mechanical angle can be suppressed. The exciting force that deforms once is generated by eccentricity, and the exciting force that deforms twice is generated by elliptical deformation. Therefore, the control device 1 of this embodiment can correct each of the eccentricity and the elliptical deformation. Further, even when the eccentricity and the elliptical deformation simultaneously occur, the eccentricity and the elliptical deformation can be detected as superimposition, and hence both of them can be simultaneously corrected.

Next, a method of detecting the magnetic flux density variation for correction is described. As one detection method, there is known a method of using a magneto-electric device configured to detect magnetism to output electricity. Examples of the magneto-electric device include a Hall sensor, a tunnel magnetoresistive effect (TMR) element, a giant magnetoresistive (GMR) element, and a search coil.

For example, Hall sensors are arranged at equal intervals of every 120 degrees in mechanical angle at center positions of the three groups and on leading end portions (gap surfaces) of the stator teeth 208 of the rotary electric machine 2. With this arrangement, the variation in gap magnetic flux density can be detected, and hence the correction value is calculated so as to reduce the variation based on the detected magnetic flux densities. Specifically, a correction value for decreasing the current command value is calculated for a group positioned at a place corresponding to a sensor having a high magnetic flux density, and a correction value for increasing the current command value is calculated for a group positioned at a place corresponding to a sensor having a low magnetic flux density. Similar effects can be achieved even when other magneto-electric devices are used. It is described that the sensors are arranged for every 120 degrees, but three or more sensors may be used to detect the variation with a smaller detection pitch.

Further, in place of the search coil, the stator coil may be used for detection. In this case, the variation in gap magnetic flux density can be detected without adding members dedicated to detection.

In the above-mentioned correction method, detection of the magnetic flux density variation may be continuously executed during operation to correct the correction coefficient as required, or detection of the magnetic flux density variation may be executed at the initial stage to calculate the correction coefficient and then estimate the magnetic flux variation during operation through use of the calculated value. Eccentricity and deviation from circularity do not greatly change over time, and hence when the correction coefficient calculated at the initial stage is used, a calculation load of the control device can be reduced. Meanwhile, when eccentricity caused by whirling greatly changes over time, it is preferred to continuously detect the magnetic flux density variation to correct the correction coefficient as required.

As another detection method, there is known a method of detecting actual energization current variation of each group with respect to the current command value to calculate the correction coefficient. Otherwise, there is known a method of detecting energization variation of each group of a no-load induced voltage to calculate the correction coefficient.

The method of correcting the magnetic flux density variation described in this embodiment is particularly effective when the stator 202 or the rotor 201 is formed of a combination of cores divided in the circumferential direction, and also when the stator 202 or the rotor 201 is annularly formed by bending a linearly punched-out core.

Further, the method is particularly effective also when a component in contact with the stator 202 or the rotor 201, for example, a frame is formed by bending planar components into an annular shape and then assembling those components with respect to the stator 202 or the rotor 201 by a method such as shrink-fitting or press-fitting. The reason therefor is because circularity deviation is liable to occur in the stator and the rotor 201 formed by those methods.

In this embodiment, the eccentricity is detected from three or more detection points, and hence an eccentricity amount and an eccentricity direction can be calculated, that is, an eccentricity vector can be calculated. The detection value 109 of the rotational position can be corrected through use of this eccentricity vector. The correction is performed through use of a correspondence table of a correction value with respect to an eccentricity vector, which is prepared in advance. This correction may be applied only in initial correction, or may be continuously applied.

In this manner, the detection error of the rotational position due to eccentricity can be reduced, and thus vibration and noise caused by an exciting force or torque pulsation due to deviation from an ideal value of the current command value (current command value in a case in which no eccentricity or circularity deviation occurs) can be reduced.

In the control device of this embodiment, an exciting force that deforms three times at equal intervals and equal amplitudes with respect to one period in mechanical angle (triangle deformation) cannot be corrected because the correction values in the three groups become equal to each other. However, when eccentricity is superimposed thereto, correction is possible.

Further, in the control device of this embodiment, an exciting force that deforms four times with respect to one period in mechanical angle cannot be corrected accurately because the degree of freedom for correction is insufficient.

Second Embodiment

Figure 6:
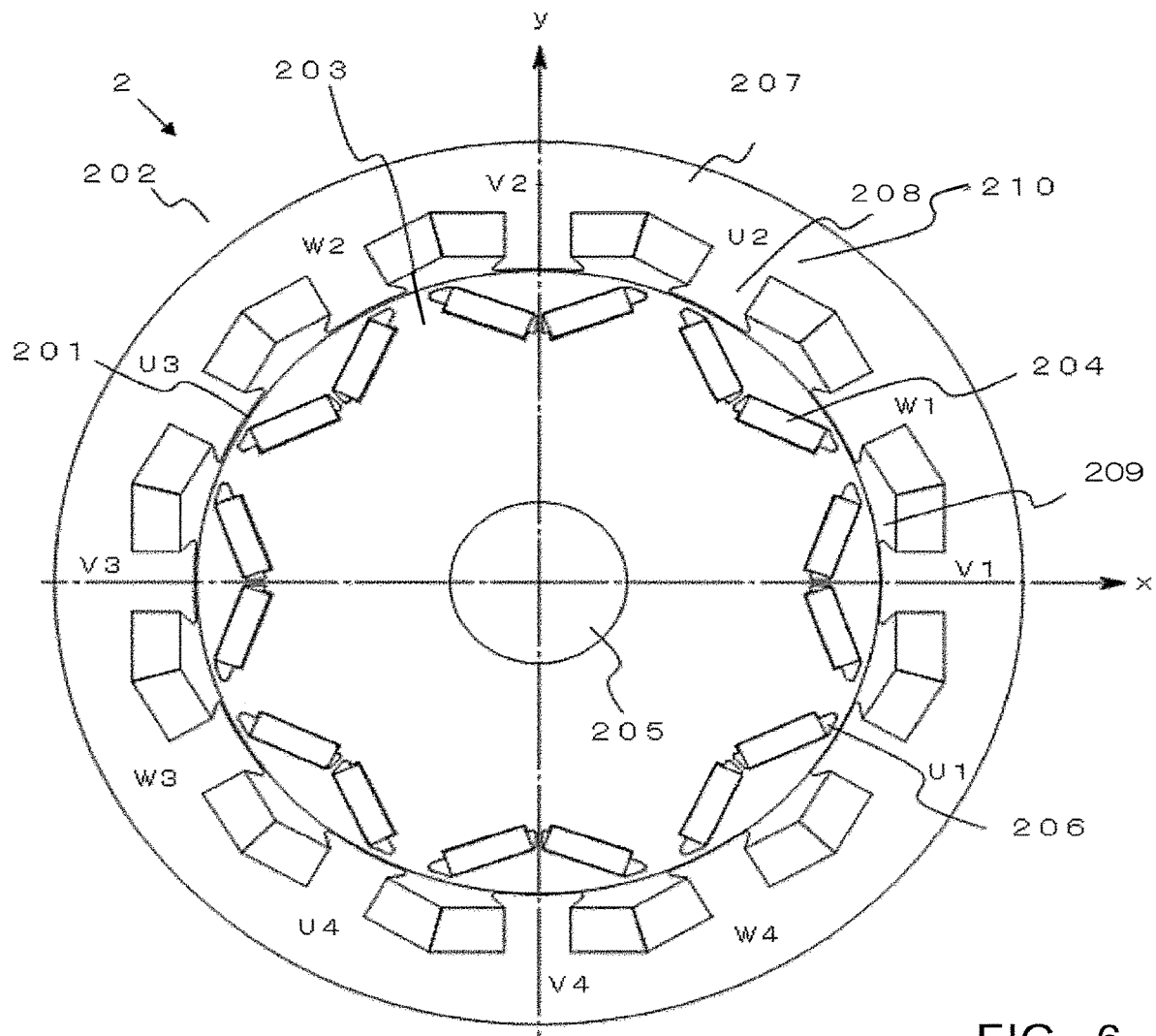
FIG. 6 is a schematic sectional view for illustrating a rotary electric machine in a second embodiment of the present invention.

FIG. 6 is a schematic sectional view for illustrating the structure of a multigroup, multiphase rotary electric machine in a second embodiment for embodying the present invention. In this embodiment, description is given of a four-group three-phase concentrated-winding permanent-magnet synchronous rotary electric machine illustrated in FIG. 6 as an example.

As illustrated in FIG. 6, the rotary electric machine 2 of this embodiment is a four-group three-phase concentrated-winding rotary electric machine having eight poles and twelve slots. Phase coils of each group are arranged so as to be wound around the stator teeth 208, and a U-phase coil, a V-phase coil, and a W-phase coil are arranged in order. One period in electric angle corresponds to 90 degrees in mechanical angle, and windings of the first group, the second group, the third group, and the fourth group are arranged in order for every one pole pair and three slots.

In this embodiment, the rotary electric machine 2 is connected to a control device similar to the control device according to the first embodiment illustrated in FIG. 3. However, the inverter 3 includes four three-phase inverters respectively corresponding to the four groups. Currents flowing through the per-phase windings of the four groups are corrected by different correction coefficients.

The control device configured as described above can address and correct not only the eccentricity or the circularity deviation of the stator or the rotor 201, but also triangle deformation. As a result, occurrence of vibration and noise of the rotary electric machine can be suppressed.

Third Embodiment

Figure 7:
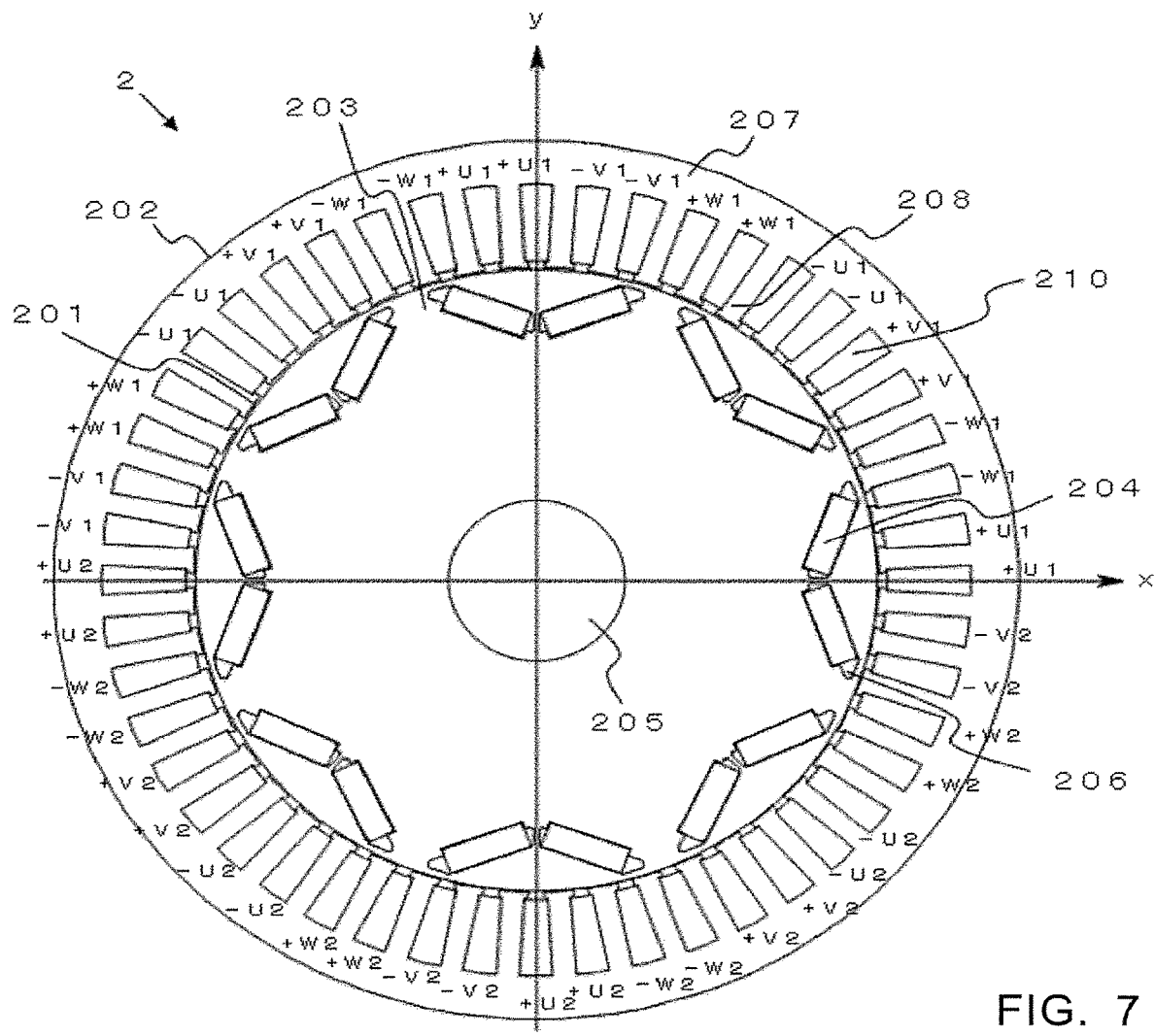
FIG. 7 is a schematic sectional view for illustrating a rotary electric machine in a third embodiment of the present invention.

FIG. 7 is a schematic sectional view for illustrating the structure of a multigroup, multiphase rotary electric machine in a third embodiment for embodying the present invention. In this embodiment, description is given of a two-group three-phase distributed-winding permanent-magnet synchronous rotary electric machine illustrated in FIG. 7 as an example.

As illustrated in FIG. 7, the rotary electric machine of this embodiment is a two-group three-phase distributed-winding rotary electric machine having eight poles and forty-eight slots. The winding of the first group is wound in the circumferential direction for four poles and twenty-four slots, and then the winding of the second group is wound for other four poles and twenty-four slots.

In this embodiment, the rotary electric machine 2 is connected to a control device similar to the control device according to the first embodiment illustrated in FIG. 3. However, the inverter 3 includes two three-phase inverters respectively corresponding to the two groups. Currents flowing through the per-phase windings of the two groups are corrected by different correction coefficients.

In the control device configured as described above, windings of different groups are always arranged at positions mechanically opposing each other at 180 degrees. Therefore, when eccentricity occurs, the direction in which the stator and the rotor 201 approach each other and the direction in which the stator and the rotor 201 separate away from each other can be detected, and thus the eccentricity can be corrected. As a result, occurrence of vibration and noise of the rotary electric machine can be suppressed.

However, in the rotary electric machine of this embodiment, when the core has elliptical deformation, the stator and the rotor 201 approach and separate away from each other in the same way at positions opposing each other at 180 degrees, and hence correction cannot be performed.

Fourth Embodiment

Figure 8:
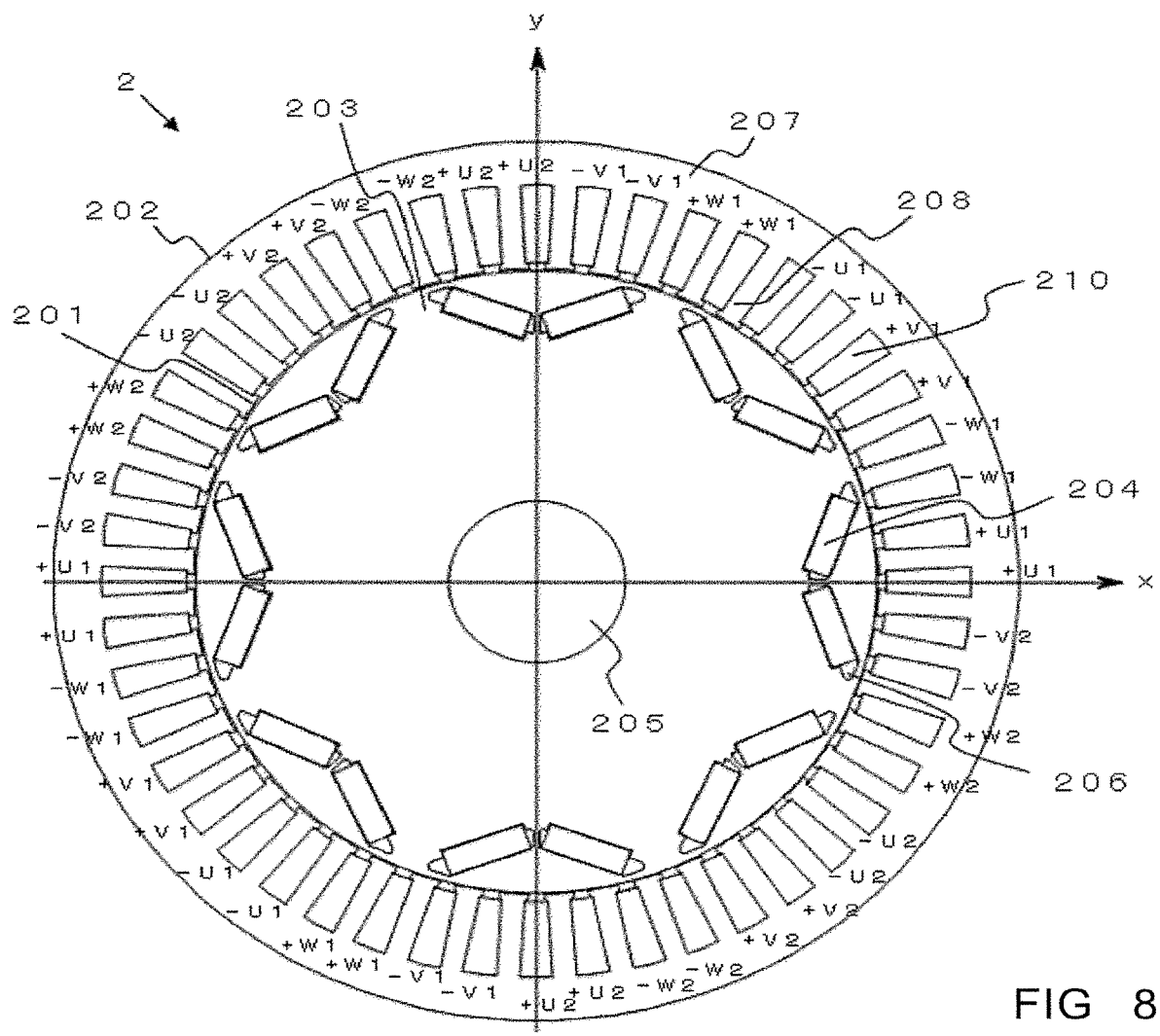
FIG. 8 is a schematic sectional view for illustrating a rotary electric machine in a fourth embodiment of the present invention.

FIG. 8 is a schematic sectional view for illustrating the structure of a multigroup, multiphase rotary electric machine in a fourth embodiment for embodying the present invention. In this embodiment, description is given of a two-group three-phase distributed-winding permanent-magnet synchronous rotary electric machine illustrated in FIG. 8 as an example.

As illustrated in FIG. 8, the rotary electric machine of this embodiment is a two-group three-phase distributed-winding rotary electric machine having eight poles and forty-eight slots. The winding of the first group is wound in the circumferential direction for two poles and twelve slots. Then, the winding of the second group is wound for other two poles and twelve slots, and then the winding of the first group and the winding of the second group are wound. In this manner, the windings of the first group and the windings of the second group are alternately arranged two times for every 90 degrees in mechanical angle.

In this embodiment, the rotary electric machine 2 is connected to a control device similar to the control device according to the first embodiment illustrated in FIG. 3. However, the inverter 3 includes two three-phase inverters respectively corresponding to the two groups. Currents flowing through the per-phase windings of the two groups are corrected by different correction coefficients.

In the control device configured as described above, windings of different groups are always arranged at positions mechanically opposing each other at 90 degrees. Therefore, when elliptical deformation occurs, the approaching direction and the separating direction (short-axis direction and long-axis direction) can be detected, and thus the elliptical deformation can be corrected. As a result, occurrence of vibration and noise of the rotary electric machine can be suppressed.

However, in the rotary electric machine of this embodiment, windings of the same group are arranged at positions opposing each other at 180 degrees. Therefore, eccentricity cannot be corrected because the eccentricity is averaged in the windings of the same group and the first group and the second group hardly have a difference with respect to the eccentricity.

Fifth Embodiment

Figure 9:
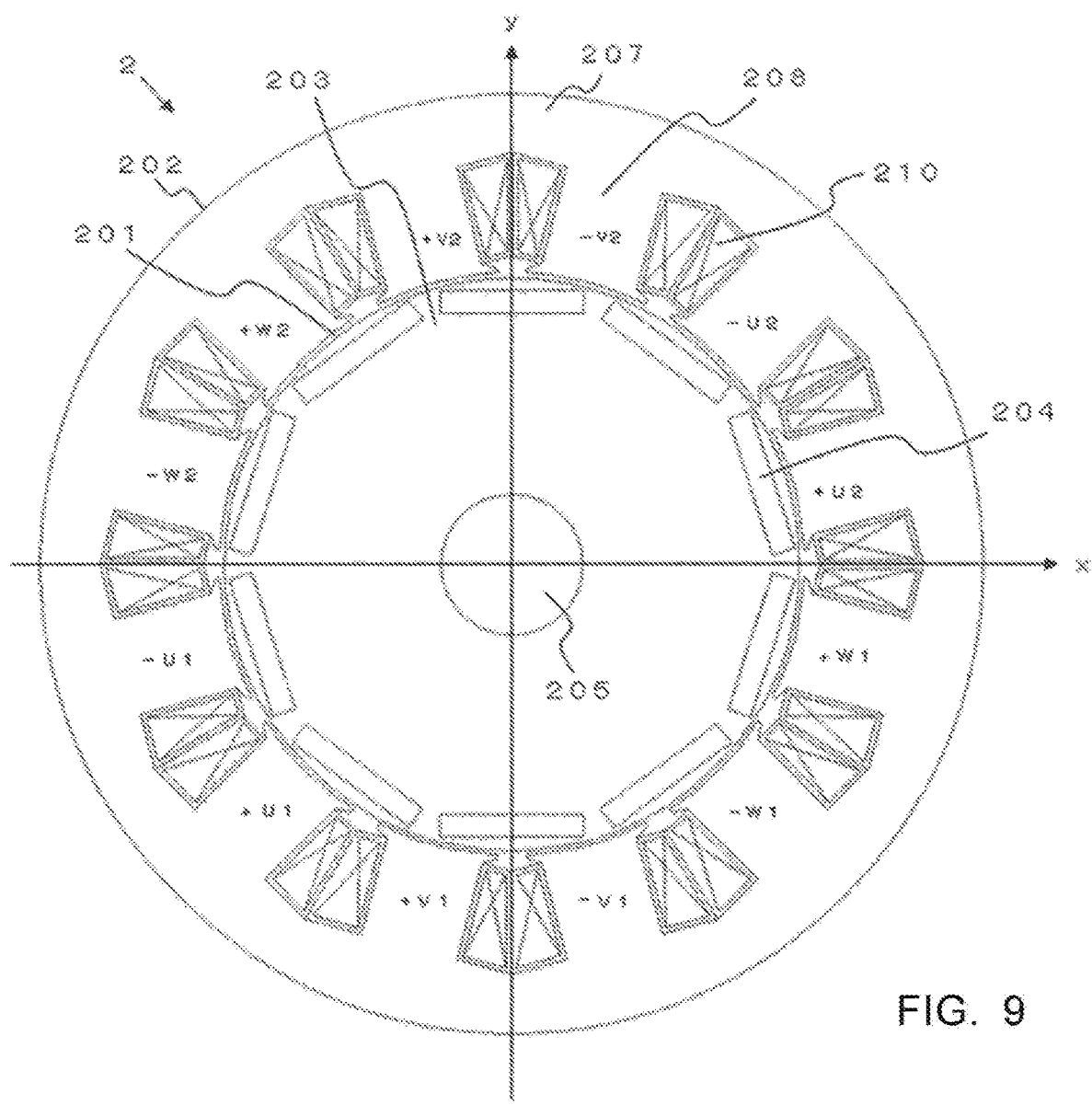
FIG. 9 is a schematic sectional view for illustrating a rotary electric machine in a fifth embodiment of the present invention.

FIG. 9 is a schematic sectional view for illustrating the structure of a multigroup, multiphase rotary electric machine in a fifth embodiment for embodying the present invention. In this embodiment, description is given of a two-group three-phase concentrated-winding permanent-magnet synchronous rotary electric machine illustrated in FIG. 9 as an example.

As illustrated in FIG. 9, the rotary electric machine 2 of this embodiment is a dual three-phase concentrated-winding rotary electric machine having ten poles and twelve slots.

In this embodiment, the rotary electric machine 2 is connected to a control device similar to the control device according to the first embodiment illustrated in FIG. 3. However, the inverter 3 includes two three-phase inverters respectively corresponding to the two groups. Currents flowing through the per-phase windings of the two groups are corrected by different correction coefficients.

In the control device configured as described above, windings of different groups are arranged at positions mechanically opposing each other at 180 degrees, and hence occurrence of a low-order electromagnetic force, which is caused by eccentricity, can be suppressed. As a result, occurrence of vibration and noise of the rotary electric machine can be suppressed.

REFERENCE SIGNS LIST 1 control device, 2 rotary electric machine, 3 inverter, 201 rotor, 202 stator, 203 rotor core, 204 permanent magnets, 205 shaft, 206 magnet slot, 207 stator yoke, 208 stator teeth, 209 stator slot, 210 stator coil, 410 control target calculation unit, 411 correction coefficient calculation unit, 412 current command value correction unit, 413 voltage conversion unit, 414 PWM calculation unit.

The invention claimed is:
1. A multigroup, multiphase rotary electric machine control device, which is configured to control a multigroup, multiphase rotary electric machine including different groups of windings arranged at positions in mechanical spatial phase differing by 360/(N+1) (N is an integer of 1 or more) degrees, the multigroup, multiphase rotary electric machine control device comprising:
   a control target calculator configured to calculate an initial current command value of each phase based on a torque command value;

a correction coefficient calculator configured to calculate a per-group correction coefficient corresponding to each group from a spatial mode M (M is 0 or a positive integer) of an electromagnetic force caused by magnetic flux density variation with respect to a rotational periodicity at the time of rotation of the multigroup, multiphase rotary electric machine; and a current command value corrector configured to calculate a current command value of the each phase, which is corrected based on the initial current command value and the per-group correction coefficient.

2. The multigroup, multiphase rotary electric machine control device according to claim 1, wherein the correction coefficient calculator is configured to calculate the per-group correction coefficient through use of a detection value of magnetic flux variation of the each group of the multigroup, multiphase rotary electric machine.

3. The multigroup, multiphase rotary electric machine control device according to claim 2, wherein the detection value of the magnetic flux variation of the each group of the multigroup, multiphase rotary electric machine is detected at a plurality of locations of a gap between a rotor and a stator of the multigroup, multiphase rotary electric machine.

4. The multigroup, multiphase rotary electric machine control device according to claim 2, wherein the detection value of the magnetic flux variation of the each group of the multigroup, multiphase rotary electric machine is calculated from eccentricity vectors detected at three or more locations of a gap between a rotor and a stator of the multigroup, multiphase rotary electric machine.

5. The multigroup, multiphase rotary electric machine control device according to claim 2, wherein the detection value of the magnetic flux variation of the each group of the multigroup, multiphase rotary electric machine is calculated from variation in no-load induced voltage through use of a stator coil of the multigroup, multiphase rotary electric machine.

6. The multigroup, multiphase rotary electric machine control device according to claim 1, wherein the correction coefficient calculator is configured to calculate the per-group correction coefficient through use of an estimated value of magnetic flux variation of the each group of the multigroup, multiphase rotary electric machine.

7. The multigroup, multiphase rotary electric machine control device according to claim 1, wherein the correction coefficient calculator is configured to calculate an eccentricity vector from the magnetic flux variation of the each group of the multigroup, multiphase rotary electric machine to correct output of a rotational angle detector.

8. The multigroup, multiphase rotary electric machine control device according to claim 1, wherein the magnetic flux density variation with respect to the rotational periodicity at the time of rotation of the multigroup, multiphase rotary electric machine is caused by an eccentricity error of the multigroup, multiphase rotary electric machine.

9. The multigroup, multiphase rotary electric machine control device according to claim 1, wherein the magnetic flux density variation with respect to the rotational periodicity at the time of rotation of the multigroup, multiphase rotary electric machine is caused by an elliptical deformation of the multigroup, multiphase rotary electric machine.

10. A multigroup, multiphase rotary electric machine drive device, comprising:

the multigroup, multiphase rotary electric machine control device of claim 1; and an inverter configured to receive a current command correction value from the multigroup, multiphase rotary electric machine control device to cause a current to flow through a winding of the multigroup, multiphase rotary electric machine based on the current command correction value.

11. The multigroup, multiphase rotary electric machine control device according to claim 1, wherein B is less than a product of A and k, B is a multiple of k, A is a number of winding groups, k is a number of times that windings of each group are alternately arranged, and B is a number of times that the magnetic flux variations of each group are occurred symmetrically per rotation.

* * * * *